US010153698B1

(12) United States Patent
Katrak

(10) Patent No.: US 10,153,698 B1
(45) Date of Patent: Dec. 11, 2018

(54) CONTROL SYSTEM FOR TRANSITIONING A DC-DC VOLTAGE CONVERTER FROM A BUCK OPERATIONAL MODE TO A SAFE OPERATIONAL MODE

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/982,072

(22) Filed: May 17, 2018

Related U.S. Application Data

(60) Provisional application No. 62/538,840, filed on Jul. 31, 2017.

(51) Int. Cl.
H02M 3/158 (2006.01)
H02M 1/00 (2006.01)
H02M 3/157 (2006.01)
G05F 1/62 (2006.01)

(52) U.S. Cl.
CPC .............. *H02M 3/158* (2013.01); *G05F 1/62* (2013.01); *H02M 3/157* (2013.01); *H02M 2001/0032* (2013.01)

(58) Field of Classification Search
CPC ........ H02M 3/158; H02M 3/15; H02M 3/157; H02M 3/1584; H02M 1/32; H02M 1/36; H02M 1/08; H02M 2001/0032; H02M 3/33507; H02M 3/33515; G05F 1/62
See application file for complete search history.

(56) References Cited

U.S. PATENT DOCUMENTS

| | | | | | |
|---|---|---|---|---|---|
| 6,137,280 | A | * | 10/2000 | Ackermann | H02J 7/0008 323/224 |
| 2010/0202161 | A1 | * | 8/2010 | Sims | H02M 7/02 363/20 |
| 2010/0207594 | A1 | * | 8/2010 | Davoudi | H02M 3/157 323/283 |
| 2014/0362480 | A1 | * | 12/2014 | Veil | B25J 9/1674 361/18 |

(Continued)

OTHER PUBLICATIONS

U.S. Appl. No. 15/651,005, filed Jul. 17, 2017 entitled Control System for Controlling Operational Modes of a DC-DC Voltage Converter.

(Continued)

*Primary Examiner* — Gustavo Rosario Benitez
(74) *Attorney, Agent, or Firm* — Buckert Patent & Trademark Law Firm PC; John F. Buckert

(57) ABSTRACT

A control system for transitioning a DC-DC voltage converter from a buck operational mode to a safe operational mode is provided. The DC-DC voltage converter has a DC-DC voltage converter control circuit with a high side integrated circuit and a low side integrated circuit. The high side integrated circuit has a first plurality of FET switches therein. The low side integrated circuit has a second plurality of FET switches therein. The control system includes a microcontroller having a digital input-output device, first and second applications, and a hardware abstraction layer. The first application sends a first command value to the hardware abstraction layer in order to transition the first and second plurality of FET switches to the open operational state.

11 Claims, 9 Drawing Sheets

(56) References Cited

U.S. PATENT DOCUMENTS

| | | | | |
|---|---|---|---|---|
| 2015/0012781 A1* | 1/2015 | Katrak | .................... | G06F 11/24 |
| | | | | 714/37 |
| 2015/0270727 A1* | 9/2015 | Fukute | ............... | G01R 31/3658 |
| | | | | 320/107 |
| 2015/0326120 A1* | 11/2015 | Kelin | .................... | H02M 3/158 |
| | | | | 323/282 |
| 2018/0054123 A1* | 2/2018 | Katrak | ................. | H02J 7/0065 |
| 2018/0219419 A1* | 8/2018 | Ettes | ................... | H02M 3/3376 |

OTHER PUBLICATIONS

U.S. Appl. No. 15/682,143, filed Aug. 21, 2017 entitled Control System for Transitioning a DC-DC Voltage Converter From a Buck Operational Mode to a Safe Operational Mode.

U.S. Appl. No. 15/722,326, filed Oct. 2, 2017 entitled Control System for Transitioning a DC-DC Voltage Converter From a Boost Operational Mode to a Safe Operational Mode.

\* cited by examiner

| COMMAND VALUES<br>FIRST PLURALITY OF FET SWITCHES<br>SECOND PLURALITY OF FET SWITCHES | OPEN (HEX)<br>7D | CLOSE (HEX)<br>D7 |
|---|---|---|

| COMMAND VALUES<br>FIRST PLURALITY OF FET SWITCHES<br>SECOND PLURALITY OF FET SWITCHES | OPEN (HEX)<br>B7 | CLOSE (HEX)<br>7B |
|---|---|---|

| COMMAND VALUES<br>HIGH VOLTAGE SWITCH | OPEN (HEX)<br>81 | CLOSE (HEX)<br>18 |
|---|---|---|

| COMMAND VALUES<br>LOW VOLTAGE SWITCH | OPEN (HEX)<br>42 | CLOSE (HEX)<br>24 |
|---|---|---|

| COMMAND VALUES<br>PRE-CHARGE HIGH VOLTAGE SWITCH | OPEN (HEX)<br>28 | CLOSE (HEX)<br>82 |
|---|---|---|

| COMMAND VALUES<br>PRE-CHARGE LOW VOLTAGE SWITCH | OPEN (HEX)<br>14 | CLOSE (HEX)<br>41 |
|---|---|---|

| CONFIRMATION VALUES<br>FIRST PLURALITY OF FET SWITCHES<br>SECOND PLURALITY OF FET SWITCHES | OPEN (HEX)<br>EB | CLOSE (HEX)<br>BE |
|---|---|---|

| CONFIRMATION VALUES<br>FIRST PLURALITY OF FET SWITCHES<br>SECOND PLURALITY OF FET SWITCHES | OPEN (HEX)<br>DE | CLOSE (HEX)<br>ED |
|---|---|---|

CONTROL SYSTEM FOR TRANSITIONING A DC-DC VOLTAGE CONVERTER FROM A BUCK OPERATIONAL MODE TO A SAFE OPERATIONAL MODE

CROSS-REFERENCE TO RELATED APPLICATION

This application claims priority to U.S. Provisional Patent Application No. 62/538,840 filed on Jul. 31, 2017, the entire contents of which are hereby incorporated by reference herein.

BACKGROUND

The inventor herein has recognized a need for an improved control system for transitioning a DC-DC voltage converter from a buck operational mode to a safe operational mode. In particular, the control system utilizes redundant and independent applications that send distinct command values to a hardware abstraction layer to command a microcontroller to generate control signals to transition desired switches within a DC-DC voltage converter control circuit in the DC-DC voltage converter to open operational states. The distinct command values have a Hamming distance of at least four from one another to ensure that correct command values are being received by the hardware abstraction layer.

As a result, the inventive control system can more reliably transition the DC-DC voltage converter to the safe operational mode.

SUMMARY

A control system for transitioning a DC-DC voltage converter from a buck operational mode to a safe operational mode in accordance with an exemplary embodiment is provided. The DC-DC voltage converter has a DC-DC voltage converter control circuit with a high side integrated circuit and a low side integrated circuit. The high side integrated circuit has a first plurality of FET switches therein. The low side integrated circuit has a second plurality of FET switches therein. The control system includes a microcontroller having a digital input-output device, first and second applications, and a hardware abstraction layer. The first application sends a first command value to the hardware abstraction layer in order to transition the first and second plurality of FET switches to the open operational state. The hardware abstraction layer commands the digital input-output device to generate a first control signal that is received at a first input pin of the high side integrated circuit and a first input pin of the low side integrated circuit to transition the first and second plurality of FET switches to the open operational state, when the first command value is equal to a second command value. The second application sends a third command value to the hardware abstraction layer in order to transition the first and second plurality of FET switches to the open operational state. The third command value has a Hamming distance of at least four from the first command value. The hardware abstraction layer commands the digital input-output device to generate a second control signal that is received at a second input pin of the high side integrated circuit and a second input pin of the low side integrated circuit to transition the first and second plurality of FET switches to the open operational state, when the third command value is equal to a fourth command value.

A control system for transitioning a DC-DC voltage converter from a buck operational mode to a safe operational mode in accordance with another exemplary embodiment is provided. The DC-DC voltage converter has a high voltage switch and a pre-charge high voltage switch. The control system includes a microcontroller having a digital input-output device, first and second applications, and a hardware abstraction layer. The first application sends a first command value to the hardware abstraction layer in order to transition the high voltage switch to an open operational state. The hardware abstraction layer commands the digital input-output device to generate a first control signal that is received at the high voltage switch to transition the high voltage switch to the open operational state, when the first command value is equal to a second command value. The second application sends a third command value to the hardware abstraction layer in order to transition the pre-charge high voltage switch to the open operational state, the third command value having a Hamming distance of at least four from the first command value. The hardware abstraction layer commands the digital input-output device to generate a second control signal that is received at the pre-charge high voltage switch to transition the pre-charge high voltage switch to the open operational state, when the third command value is equal to a fourth command value.

A control system for transitioning a DC-DC voltage converter from a buck operational mode to a safe operational mode in accordance with another exemplary embodiment is provided. The DC-DC voltage converter has a low voltage switch and a pre-charge low voltage switch. The control system includes a microcontroller having a digital input-output device, first and second applications, and a hardware abstraction layer. The first application sends a first command value to the hardware abstraction layer in order to transition the low voltage switch to an open operational state. The hardware abstraction layer commands a digital input-output device to generate a first control signal that is received at the low voltage switch to transition the low voltage switch to the open operational state, when the first command value is equal to a second command value. The second application sends a third command value to the hardware abstraction layer in order to transition the pre-charge low voltage switch to the open operational state. The third command value has a Hamming distance of at least four from the first command value. The hardware abstraction layer commands the digital input-output device to generate a second control signal that is received at the pre-charge low voltage switch to transition the pre-charge low voltage switch to the open operational state, when the third command value is equal to a fourth command value.

BRIEF DESCRIPTION OF THE DRAWINGS

FIG. 13 is a table of commands values utilized by the first application shown in FIG. 3;

FIG. 14 is a table of commands values utilized by the second application shown in FIG. 3;

FIG. 15 is a table of commands values utilized by the third application shown in FIG. 3;

FIG. 16 is a table of commands values utilized by the fourth application shown in FIG. 3;

FIG. 17 is a table of commands values utilized by the fifth application shown in FIG. 3;

FIG. 18 is a table of commands values utilized by the sixth application shown in FIG. 3;

FIG. 19 is a table of confirmation values utilized by the seventh application shown in FIG. 3; and FIG. 20 is a table of confirmation values utilized by the eighth application shown in FIG. 3.

DETAILED DESCRIPTION

Figure 1:
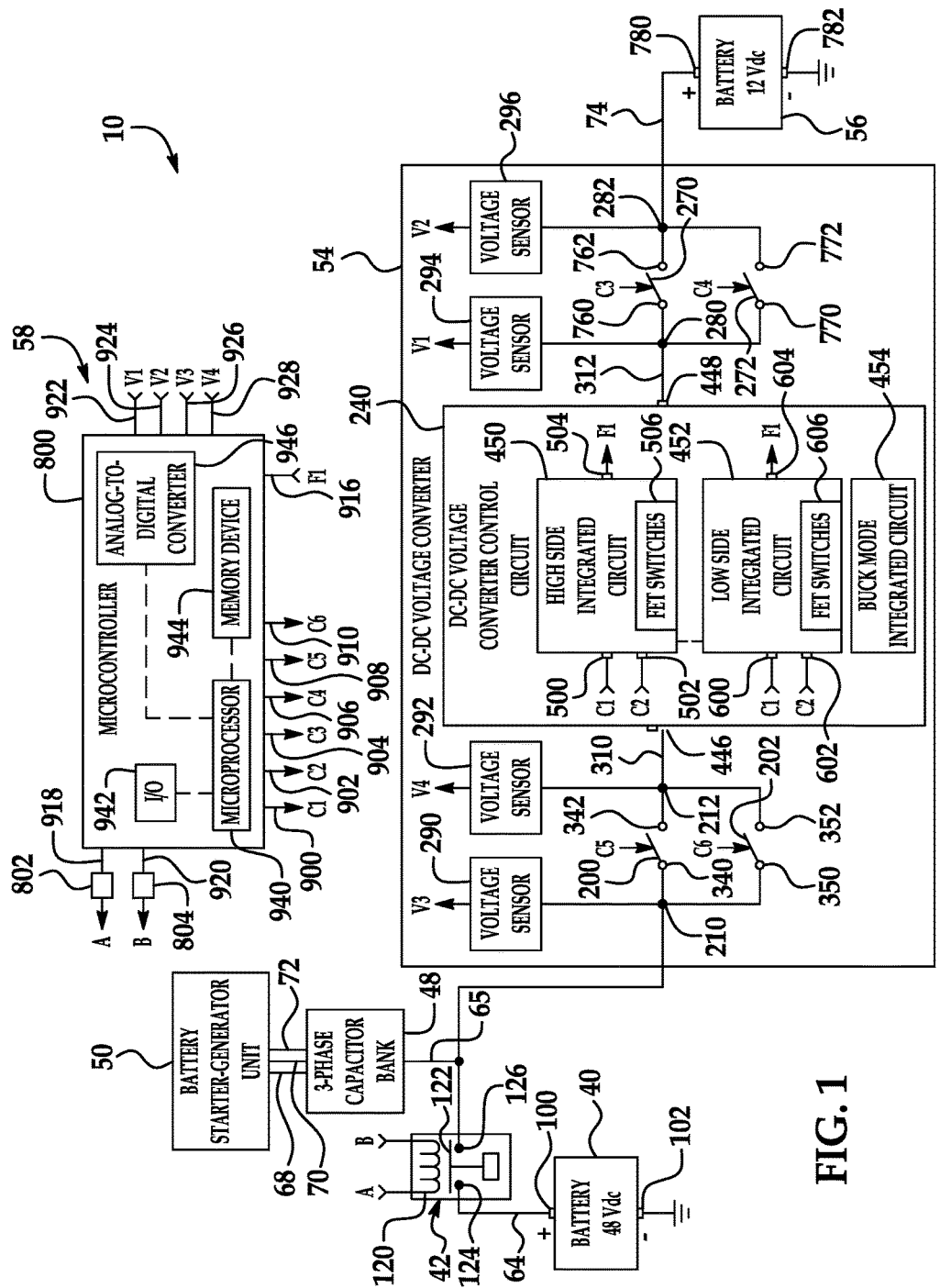
FIG. 1 is a schematic of a vehicle having a control system for a DC-DC voltage converter in accordance with an exemplary embodiment.

Referring to FIG. 1, a vehicle 10 is provided. The vehicle 10 includes a battery 40, a contactor 42, a 3-phase capacitor bank 48, a battery-starter generator unit 50, a DC-DC voltage converter 54, a battery 56, a control system 58, and electrical lines 64, 65, 68, 70, 72, 74.

Figure 3:
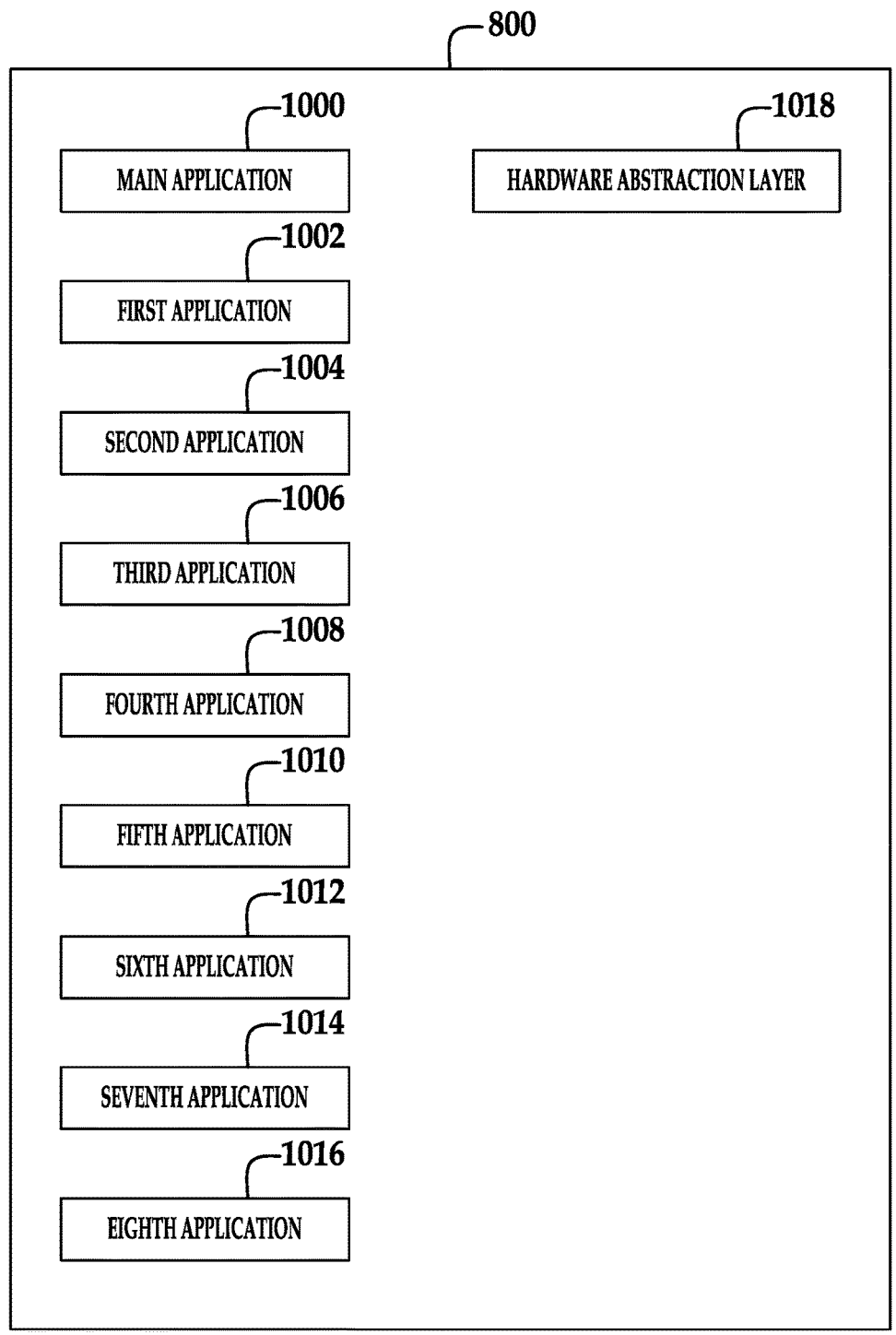
FIG. 3 is a block diagram of a main application, and first, second, third, fourth, fifth, sixth, seventh, and eighth applications, and a hardware abstraction layer utilized by a microcontroller in the control system of FIG. 1.

Referring to FIGS. 1 and 3, an advantage of the control system 58 is that the control system 58 has a microcontroller 800 that can more reliably transition the DC-DC voltage converter 54 from a buck operational mode to a safe operational mode. In particular, the microcontroller 800 utilizes redundant and independent applications that send distinct command values to a hardware abstraction layer 1018 to command the microcontroller 800 to generate control signals to transition desired switches within a DC-DC voltage converter control circuit 240 in the DC-DC voltage converter 54 to open operational states. The distinct command values have a Hamming distance of at least four from one another to ensure that correct command values are being received by the hardware abstraction layer 1018. As a result, the inventive control system can more reliably transition the DC-DC voltage converter 54 to the safe operational mode.

For purposes of understanding, a few terms utilized herein will be described.

A node or an electrical node is a region or a location in an electrical circuit. A signal can be an electrical voltage, an electrical current, or a binary value.

A buck operational mode is an operational mode of the DC-DC voltage converter 54 in which the DC-DC voltage converter 54 applies a voltage to the battery 56. In an exemplary embodiment, when the DC-DC voltage converter 54 has the buck operational mode, the contactor 42 has a closed operational state, the high voltage switch 200 has a closed operational state, the FET switches 506, 606 are being switched as desired, and the low voltage switch 270 has a closed operational state. The pre-charge high voltage switch 202 may have a closed operational state, and the pre-charge low voltage switch 272 may have a closed operational state.

A safe operational mode is an operational mode of the DC-DC voltage converter 54 in which the DC-DC voltage converter 54 does not apply a voltage to the battery 56 or to the battery 40. In an exemplary embodiment, when the DC-DC voltage converter 54 has the safe operational mode, the contactor 42 has an open operational state, the high voltage switch 200 has an open operational state, the pre-charge high voltage switch 202 has an open operational state, the FET switches 506, 606 have the open operational state, the low voltage switch 270 has an open operational state, and the pre-charge low voltage switch 272 has an open operational state.

A hardware abstraction layer is a layer of programming (e.g., low-level programs or applications) that allows an application to interact with a digital input-output device 942 and an analog-to-digital converter 946 at a general or abstract level rather than at a detailed hardware level.

The battery 40 includes a positive terminal 100 and a negative terminal 102. In an exemplary embodiment, the battery 40 generates 48 Vdc between the positive terminal 100 and the negative terminal 102. The positive terminal 100 is electrically coupled to a first electrical node 124 on a first side of the contactor 42. The negative terminal 102 is electrically coupled to an electrical ground.

The contactor 42 has a contactor coil 120, a contact 122, a first electrical node 124 and a second electrical node 126. The first electrical node 124 is electrically coupled to the positive terminal 100 of the battery 40. The second electrical node 126 is electrically coupled to both the 3-phase capacitor bank 48 and the electrical node 210 of the DC-DC voltage converter 54. When the microcontroller 800 generates first and second control signals that are received by the voltage drivers 802, 804, respectively, the contactor coil 120 is energized which transitions the contact 122 to a closed operational state. Alternately, when the microcontroller 800 generates third and fourth control signals that are received by the voltage drivers 802, 804, respectively, the contactor coil 120 is de-energized which transitions the contact 122 to an open operational state. In an exemplary embodiment, the third and fourth control signals can each be a ground voltage level.

The 3-phase capacitor bank 48 is utilized to store and release electrical energy from the battery starter-generator unit 50, the battery 40, and the DC-DC voltage converter 54. The 3-phase capacitor bank 48 is electrically coupled to the electrical node 126 of the contactor 126 and the electrical node 210 of the DC-DC voltage converter 54 utilizing the electrical line 65. The 3-phase capacitor bank 48 is further electrically coupled to the battery-starter generator 50 utilizing the electrical lines 68, 70, 72.

The battery-starter generator unit 50 is provided to generate an AC voltage that is received by the 3-phase capacitor bank 48 via the electrical lines 68, 70, 72.

The DC-DC voltage converter 54 includes a high voltage switch 200, a pre-charge high voltage switch 202, electrical nodes 210, 212, a DC-DC voltage converter control circuit 240, a low voltage switch 270, a pre-charge low voltage switch 272, electrical nodes 280, 282, voltage sensors 290, 292, 294, 296, and electrical lines 310, 312.

The high voltage switch 200 includes a node 340 and a node 342. In an exemplary embodiment, the high voltage switch 200 is a high voltage bi-directional MOSFET switch. Of course, in an alternative embodiment, the high voltage switch 200 could be replaced with another type of switch having desired voltage and current capabilities. The high voltage switch 200 is electrically coupled in parallel to the pre-charge high voltage switch 202 between and to electrical nodes 210, 212. The node 340 is electrically coupled to the electrical node 210, and the node 342 is electrically coupled to the electrical node 212. When the microcontroller 800 generates a control signal that is received by the high voltage switch 200 (or that is received by a controller or a microprocessor within the DC-DC voltage converter 54 that is operably coupled to the switch 200) via the electrical line 908, the microcontroller 800 induces the switch 200 to transition to a closed operational state. When the microcontroller 800 generates another control signal (e.g., ground voltage level control signal) on the electrical line 908, the microcontroller 800 induces the switch 200 to transition to an open operational state.

The pre-charge high voltage switch 202 has a node 350 that is electrically coupled to the electrical node 210, and a node 352 that is electrically coupled to the electrical node 212. When the microcontroller 800 generates a control signal that is received by the pre-charge high voltage switch 202 (or that is received by a controller or a microprocessor within the DC-DC voltage converter 54 that is operably coupled to the switch 202) via the electrical line 910, the microcontroller 800 induces the switch 202 to transition to a closed operational state. When the microcontroller 800 generates another control signal (e.g., ground voltage level control signal) on the electrical line 910, the microcontroller 800 induces the switch 202 to transition to an open operational state. In an exemplary embodiment, the pre-charge high voltage switch 202 is a bi-directional MOSFET switch.

Figure 2:
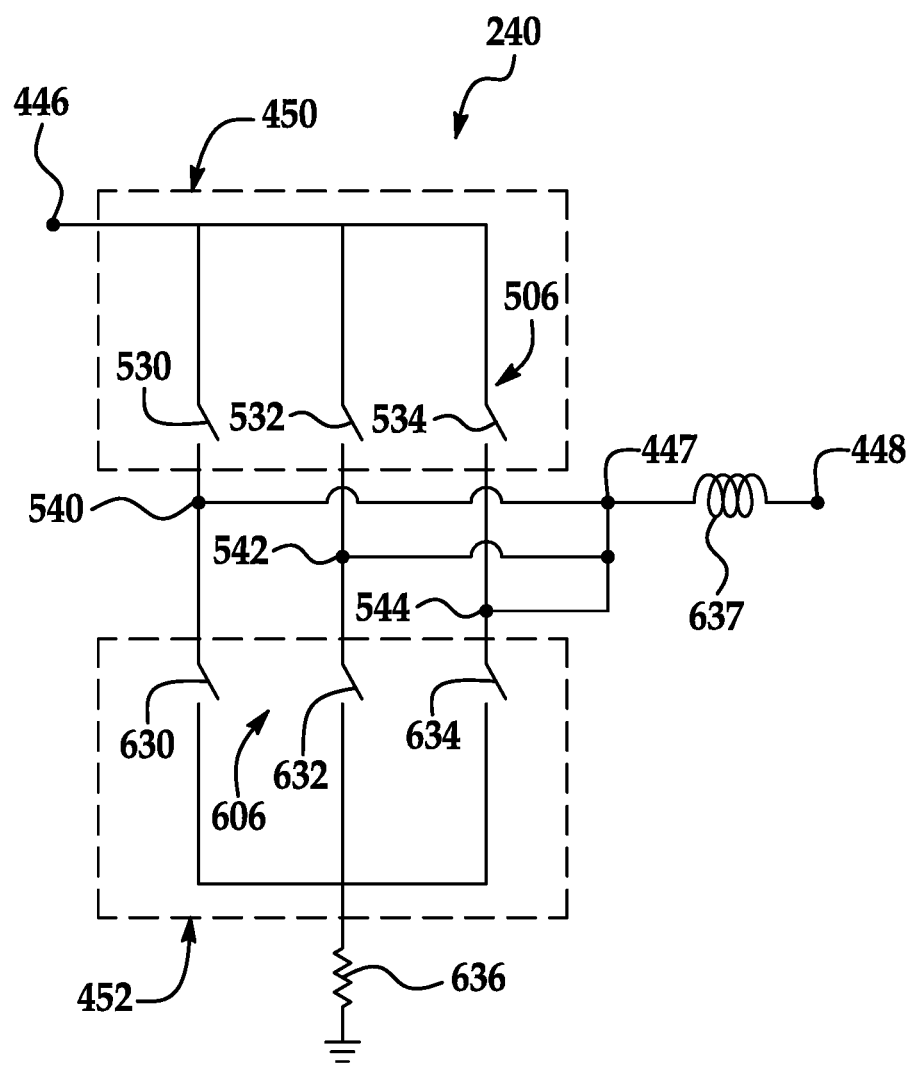
FIG. 2 is a schematic of a portion of a high side integrated circuit and a low side integrated circuit in a DC-DC voltage converter control circuit that is utilized in the DC-DC voltage converter of FIG. 1.

Referring to FIGS. 1 and 2, the DC-DC voltage converter control circuit 240 has a terminal 446, a terminal 448, a high side integrated circuit 450, a low side integrated circuit 452, a buck mode integrated circuit 454, nodes 540, 542, 544, 545, a resistor 636, and an inductor 637. The DC-DC voltage converter control circuit 240 can convert a DC voltage received at the terminal 446 to another DC voltage that is output at the terminal 448. Alternately, the DC-DC voltage converter control circuit 240 can convert a DC voltage received at the terminal 448 to another DC voltage that is output at the terminal 446.

The high side integrated circuit 450 includes an input pin 500, an input pin 502, an output pin 504, and a first plurality of FET switches 506 including FET switches 530, 532, 534 therein. The input pin 500 is electrically coupled to a digital input-output device 942 of the microcontroller 800 utilizing an electrical line 900. The input pin 502 is electrically coupled to the digital input-output device 942 of the microcontroller 800 utilizing the electrical line 902. The output pin 504 is electrically coupled to the digital input-output device 942 of the microcontroller 800 utilizing an electrical line 916.

The FET switches 530, 532, 534 have operational states (e.g., closed operational state or open operational state) controlled by control voltages received by the FET switches 530, 532, 534 from the buck mode integrated circuit 454, and further controlled by control voltages at the pins 500, 502 from the microcontroller 800. In an exemplary embodiment, the FET switches 530, 532, 534 are electrically coupled at a first end to the high voltage terminal 446. The FET switch 530 is electrically coupled between the high voltage terminal 446 and the node 540, and is further electrically coupled in series with the FET switch 630 of the low side integrated circuit 452. The FET switch 532 is electrically coupled between the high voltage terminal 446 and the node 542, and is further electrically coupled in series with the FET switch 632 of the low side integrated circuit 452. The FET switch 534 is electrically coupled between the high voltage terminal 446 and the node 544, and further electrically coupled in series with the FET switch 634 of the low side integrated circuit 452.

When the high side integrated circuit 450 receives a control signal having a high logic level at the input pin 500, the high side integrated circuit 450 enables operation of the first plurality of FET switches 506. Alternately, when the high side integrated circuit 450 receives a control signal having a low logic level at the input pin 500, the high side integrated circuit 450 transitions each FET switch of the first plurality of FET switches 506 to an open operational state. Further, when the high side integrated circuit 450 receives a control signal having a low logic level at the input pin 502, the high side integrated circuit 450 transitions each FET switch of the first plurality of FET switches 506 to an open operational state. Still further, when the high side integrated circuit 450 transitions each FET switch of the first plurality of FET switches 506 to an open operational state, the output pin 504 outputs a confirmation signal indicating that each FET switch of the first plurality of FET switches 506 has an open operational state, that is received by the digital input-output device 942 of the microcontroller 800 utilizing the electrical line 916.

The low side integrated circuit 452 includes an input pin 600, an input pin 602, an output pin 604, and a second plurality of FET switches 606 including FET switches 630, 632, 634. The input pin 600 is electrically coupled to a digital input-output device 942 of the microcontroller 800 utilizing an electrical line 900. The input pin 602 is electrically coupled to the digital input-output device 942 of the microcontroller 800 utilizing the electrical line 902. The output pin 604 is electrically coupled to the digital input-output device 942 of the microcontroller 800 utilizing an electrical line 916.

The FET switches 630, 632, 634 have operational states (e.g., closed operational state or open operational state) that are controlled by control voltages received by the FET switches 630, 632, 634 from the buck mode integrated circuit 454, and further controlled by control voltages at the pins 600, 602 from the microcontroller 800. The FET switches 630, 632, 634 are electrically coupled in series with the FET switches 530, 532, 534, respectively. The FET switches 630, 632, 634 are further electrically coupled to the resistor 636 which is further electrically coupled to electrical ground.

When the low side integrated circuit 452 receives a control signal having a high logic level at the input pin 600, the low side integrated circuit 452 enables operation of the second plurality of FET switches 606. Alternately, when the low side integrated circuit 452 receives a control signal having a low logic level at the input pin 600, the low side integrated circuit 452 transitions each FET switch of the second plurality of FET switches 606 to an open operational state. Further, when the low side integrated circuit 452 receives a control signal having a low logic level at the input pin 602, the low side integrated circuit 452 transitions each FET switch of the second plurality of FET switches 606 to an open operational state. Still further, when the low side integrated circuit 452 transitions each FET switch of the second plurality of FET switches 606 to an open operational state, the output pin 604 outputs a confirmation signal indicating that each FET switch of the second plurality of FET switches 606 has an open operational state, that is received by the digital input-output device 942 of the microcontroller 800 utilizing the electrical line 916.

The inductor 637 is electrically coupled between the node 447 and the electrical terminal 448. The nodes 540, 542, 544 are electrically coupled to the node 447.

Referring to FIG. 1, the low voltage switch 270 is electrically coupled in parallel to the pre-charge low voltage switch 272 between and to electrical nodes 280, 282. The low voltage switch 270 has a node 760 that is electrically coupled to the electrical node 280, and a node 762 that is electrically coupled to the electrical node 282. When the microcontroller 800 generates a control signal that is received by the low voltage switch 270 (or that is received by a controller or a microprocessor within the DC-DC voltage converter 54 that is operably coupled to the switch 270) via the electrical line 904, the microcontroller 800 induces the switch 270 to transition to a closed operational state. When the microcontroller 800 generates another control signal (e.g., ground voltage level control signal) on the electrical line 904, the microcontroller 800 induces the switch 270 to transition to an open operational state. In an exemplary embodiment, the low voltage switch 270 is a bi-directional MOSFET switch.

The pre-charge low voltage switch 272 has a node 770 that is electrically coupled to the electrical node 280, and a node 772 that is electrically coupled to the electrical node 282. When the microcontroller 800 generates a control signal that is received by the pre-charge low voltage switch 272 (or that is received by a controller or a microprocessor within the DC-DC voltage converter 54 that is operably coupled to the switch 272) via the electrical line 906, the microcontroller 800 induces the switch 272 to transition to a closed operational state. When the microcontroller 800 generates another control signal (e.g., ground voltage level control signal) on the electrical line 906, the microcontroller 800 induces the switch 272 to transition to an open operational state.

The voltage sensor 290 is electrically coupled to the electrical node 210 and to the microcontroller 800. The voltage sensor 290 outputs a voltage measurement signal indicating a voltage at the electrical node 210 that is received by the microcontroller 800 via the electrical line 926.

The voltage sensor 292 is electrically coupled to the electrical node 212 and to the microcontroller 800. The voltage sensor 292 outputs a voltage measurement signal indicating a voltage at the electrical node 212 that is received by the microcontroller 800 via the electrical line 928.

The voltage sensor 294 is electrically coupled to the electrical node 280 and to the microcontroller 800. The voltage sensor 294 outputs a voltage measurement signal indicating a voltage at the electrical node 280 that is received by the microcontroller 800 via the electrical line 922.

The voltage sensor 296 is electrically coupled to the electrical node 282 and to the microcontroller 800. The voltage sensor 296 outputs a voltage measurement signal indicating a voltage at the electrical node 282 that is received by the microcontroller 800 via the electrical line 924.

The battery 56 includes a positive terminal 780 and a negative terminal 782. In an exemplary embodiment, the battery 56 generates 12 Vdc between the positive terminal 780 and the negative terminal 782. The positive terminal 780 is electrically coupled to the electrical node 282 of the DC-DC voltage converter 54. The negative terminal 782 is electrically coupled to an electrical ground, which may be different that the electrical ground that the battery 40 is coupled to.

The control system 58 is utilized to transition the DC-DC voltage converter 54 from a buck operational mode to a safe operational mode. The control system 58 includes the microcontroller 800, the voltage drivers 802, 804, the voltage sensors 290, 292, 294, 296 and the electrical lines 900, 902, 904, 906, 908, 910, 916, 918, 920, 922, 924, 926, 928.

Referring to FIGS. 1 and 3, the microcontroller 800 includes a microprocessor 940, the digital input-output device 942, the memory device 944, and the analog-to-digital converter 946. The microprocessor 940 further includes a main application 1000, a first application 1002, a second application 1004, a third application 1006, a fourth application 1008, a fifth application 1010, a sixth application 1012, a seventh application 1014, an eighth application 1016, and a hardware extraction layer 1018, which are executed by the microprocessor 940. The main application 1000, the first application 1002, the second application 1004, the third application 1006, the fourth application 1008, the fifth application 1010, the sixth application 1012, the seventh application 1014, the eighth application 1016, and the hardware extraction layer 1018 are stored in the memory device 944. The microprocessor 940 is operably coupled to the digital input-output device 942, the memory device 944, and the analog-to-digital converter 946, the DC-DC voltage converter 54, and the voltage drivers 802, 804.

Referring to FIGS. 13-20, a brief description of the tables utilized by the microcontroller 800 and stored in the memory device 944 will now be explained.

Referring to FIGS. 1 and 13, a table 1300 has exemplary commands value that are utilized by the first application 1002. In particular, the table 1300 includes a command value 7D for commanding the first plurality of FET switches 506 and the second plurality of FET switches 606 in the DC-DC voltage converter control circuit 240 to transition to an open operational state. Further, the table 1300 includes a command value D7 for commanding the first plurality of FET switches 506 and the second plurality of FET switches 606 in the DC-DC voltage converter control circuit 240 to transition to a closed operational state.

Referring to FIGS. 1 and 14, a table 1310 has exemplary commands value that are utilized by the second application 1004. In particular, the table 1310 includes a command value B7 for commanding the first plurality of FET switches 506 and the second plurality of FET switches 606 in the DC-DC voltage converter control circuit 240 to transition to an open operational state. Further, the table 1310 includes a command value 7B for commanding the first plurality of FET switches 506 and the second plurality of FET switches 606 in the DC-DC voltage converter control circuit 240 to transition to a closed operational state.

Referring to FIGS. 1 and 15, a table 1320 has exemplary commands value that are utilized by the third application 1006. In particular, the table 1320 includes a command value 81 for commanding the high voltage switch 200 in the DC-DC voltage converter 54 to transition to an open operational state. Further, the table 1320 includes a command value 18 for commanding the high voltage switch 200 in the DC-DC voltage converter 54 to transition to a closed operational state.

Referring to FIGS. 1 and 16, a table 1330 has exemplary commands value that are utilized by the fourth application 1008. In particular, the table 1330 includes a command value 42 for commanding the low voltage switch 270 in the DC-DC voltage converter 54 to transition to an open operational state. Further, the table 1330 includes a command value 24 for commanding the low voltage switch 270 in the DC-DC voltage converter 54 to transition to a closed operational state.

Referring to FIGS. 1 and 17, a table 1340 has exemplary commands value that are utilized by the fifth application 1010. In particular, the table 1340 includes a command value 28 for commanding the pre-charge high voltage switch 202 in the DC-DC voltage converter 54 to transition to an open operational state. Further, the table 1340 includes a command value 82 for commanding the pre-charge high voltage switch 202 in the DC-DC voltage converter 54 to transition to a closed operational state.

Referring to FIGS. 1 and 18, a table 1350 has exemplary commands value that are utilized by the sixth application 1012. In particular, the table 1350 includes a command value 14 for commanding the pre-charge low voltage switch 272 in the DC-DC voltage converter 54 to transition to an open operational state. Further, the table 1350 includes a command value 41 for commanding the pre-charge low voltage switch 272 in the DC-DC voltage converter 54 to transition to a closed operational state.

Referring to FIGS. 1 and 19, a table 1360 has exemplary confirmation values that are utilized by the seventh application 1014. In particular, the table 1360 includes a confirmation value EB indicating that at least one of the first plurality of FET switches 506 and the second plurality of FET switches 606 in the DC-DC voltage converter control circuit 240 have been transitioned to an open operational state. Further, the table 1360 includes a confirmation value BE indicating that at least one of the first plurality of FET switches 506 and the second plurality of FET switches 606 in the DC-DC voltage converter control circuit 240 have been transitioned to a closed operational state.

Referring to FIGS. 1 and 20, a table 1370 has exemplary confirmation values that are utilized by the eighth application 1016. In particular, the table 1370 includes a confirmation value DE indicating that at least one of the first plurality of FET switches 506 and the second plurality of FET switches 606 in the DC-DC voltage converter control circuit 240 have been transitioned to an open operational state. Further, the table 1370 includes a confirmation value ED indicating that at least one of the first plurality of FET switches 506 and the second plurality of FET switches 606 in the DC-DC voltage converter control circuit 240 have been transitioned to a closed operational state.

Referring to FIGS. 13-20, all of the values in the tables 1300, 1310, 1320, 1330, 1340, 1350, 1360, 1370 have a Hamming distance of at least four from one another.

Referring to FIGS. 1 and 3-12, a flowchart of a method for inducing the DC-DC voltage converter 54 to transition from the buck operational mode to a safe operational mode is described. The flowchart includes the main application 1000, the first application 1002, the second application 1004, the third application 1006, the fourth application 1008, the fifth application 1010, the sixth application 1012, the seventh application 1014, and the eighth application 1016.

Figure 4:
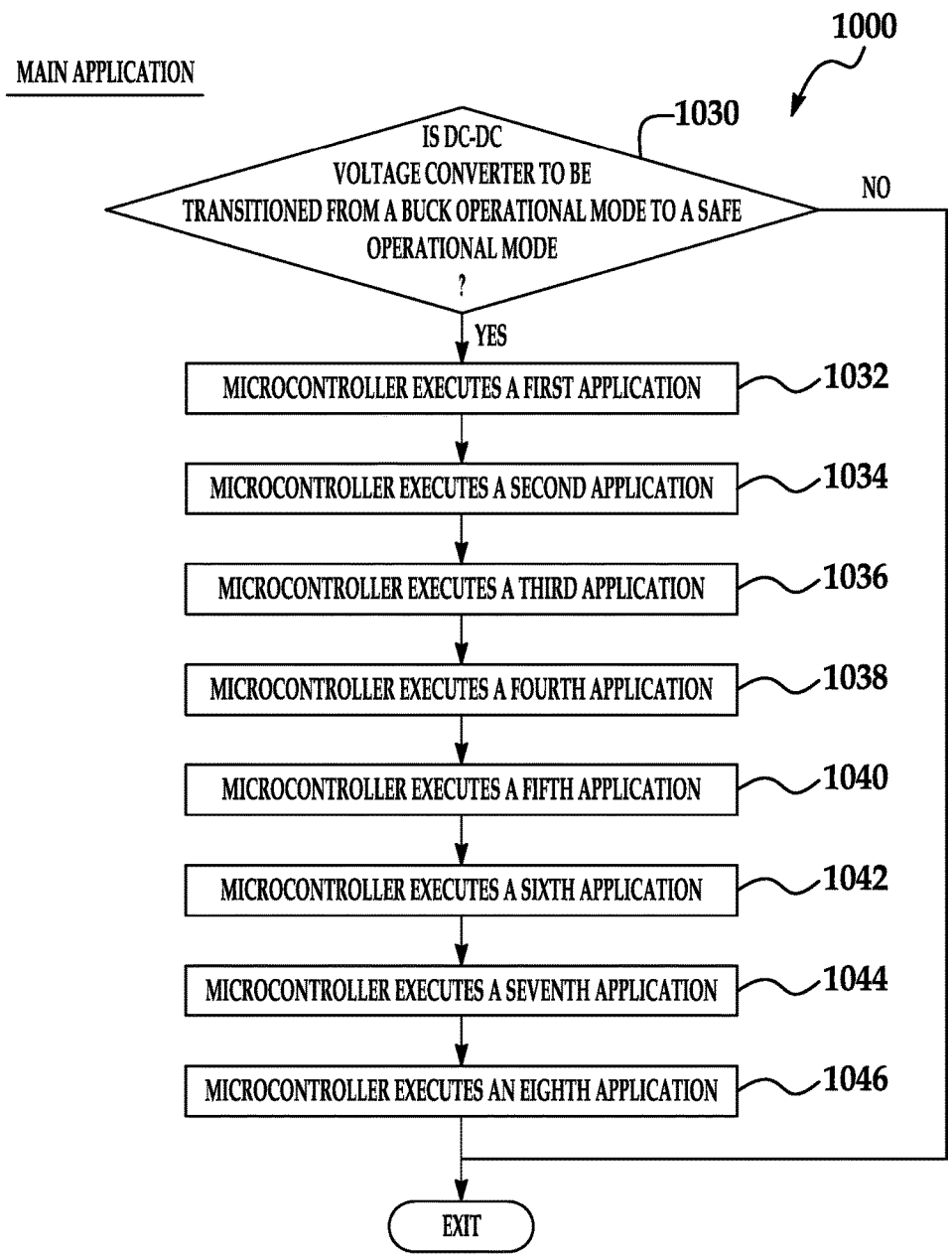
FIGS. 4-12 are a flowchart of a method for transitioning the DC-DC voltage converter from a buck operational mode to a safe operational mode.

Referring to FIG. 4, the main application 1000 will now be explained.

At step 1030, the microcontroller 800 makes a determination as to whether the DC-DC voltage converter 54 to be transitioned from a buck operational mode to a safe operational mode. If the value of step 1030 equals "yes", the method advances to step 1032. Otherwise, the method is exited.

At step 1032, the microcontroller 800 executes the first application 1002. After step 1032, the method advances to step 1034.

At step 1034, the microcontroller 800 executes the second application 1004. After step 1034, the method advances to step 1036.

At step 1036, the microcontroller 800 executes the third application 1006. After step 1036, the method advances to step 1038.

At step 1038, the microcontroller 800 executes the fourth application 1008. After step 1038, the method advances to step 1040.

At step 1040, the microcontroller 800 executes the fifth application 1010. After step 1040, the method advances to step 1042.

At step 1042, the microcontroller 800 executes the sixth application 1012. After step 1042, the method advances to step 1044.

At step 1044, the microcontroller 800 executes the seventh application 1014. After step 1044, the method advances to step 1046.

At step 1046, the microcontroller 800 executes the eighth application 1016. After step 1046, the method is exited.

Figure 5:
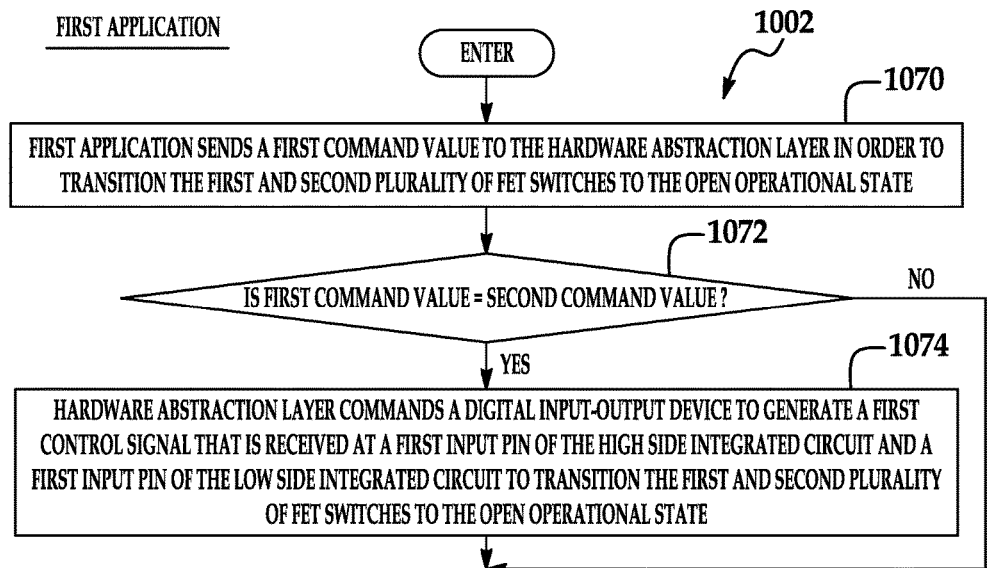

Referring to FIGS. 1 and 5, the first application 1002 will now be explained.

At step 1070, the first application 1002 sends a first command value (e.g., 7D shown in FIG. 13) to the hardware abstraction layer 1018 in order to transition the first and second plurality of FET switches 506, 606 to the open operational state. After step 1070, the method advances to step 1072.

At step 1072, the hardware abstraction layer 1018 makes a determination as to whether the first command value is equal to a second command value. If the value of step 1072 equals "yes", the method advances to step 1074. Otherwise, the method returns to the main application 1000.

At step 1074, the hardware abstraction layer 1018 commands a digital input-output device 942 to generate a first control signal that is received at a first input pin 500 of the high side integrated circuit 450 and a first input pin 600 of the low side integrated circuit 452 to transition the first and second plurality of FET switches 506, 606 to the open operational state. After step 1074, the method returns to the main application 1000.

Figure 6:
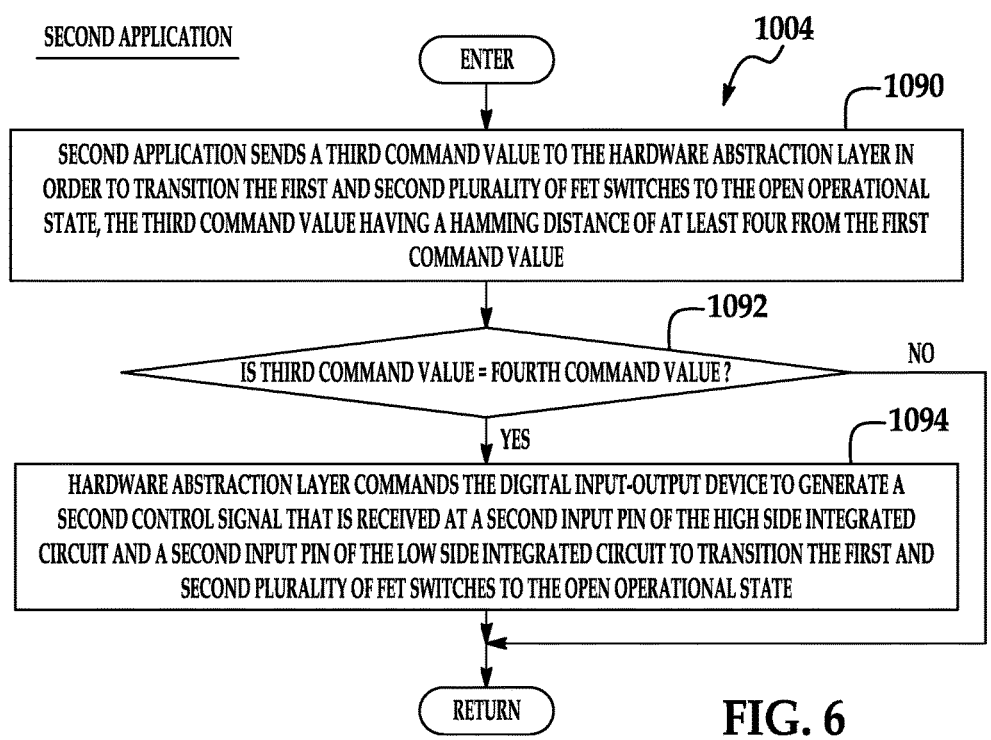

Referring to FIGS. 1 and 6, the second application 1004 will now be explained.

At step 1090, the second application 1004 sends a third command value (e.g., B7 shown in FIG. 14) to the hardware abstraction layer 1018 in order to transition the first and second plurality of FET switches 506, 606 to the open operational state. The third command value has a Hamming distance of at least four from the first command value. After step 1090, the method advances to step 1092.

At step 1092, the hardware abstraction layer 1018 makes a determination as to whether the third command value is equal to a fourth command value. If the value of step 1092 equals "yes", the method advances to step 1094. Otherwise, the method returns to the main application 1000.

At step 1094, the hardware abstraction layer 1018 commands the digital input-output device 942 to generate a second control signal that is received at a second input pin 502 of the high side integrated circuit 450 and a second input pin 602 of the low side integrated circuit 452 to transition the first and second plurality of FET switches 506, 606 to the open operational state. After step 1094, the method returns to the main application 1000.

Figures 7, 8:
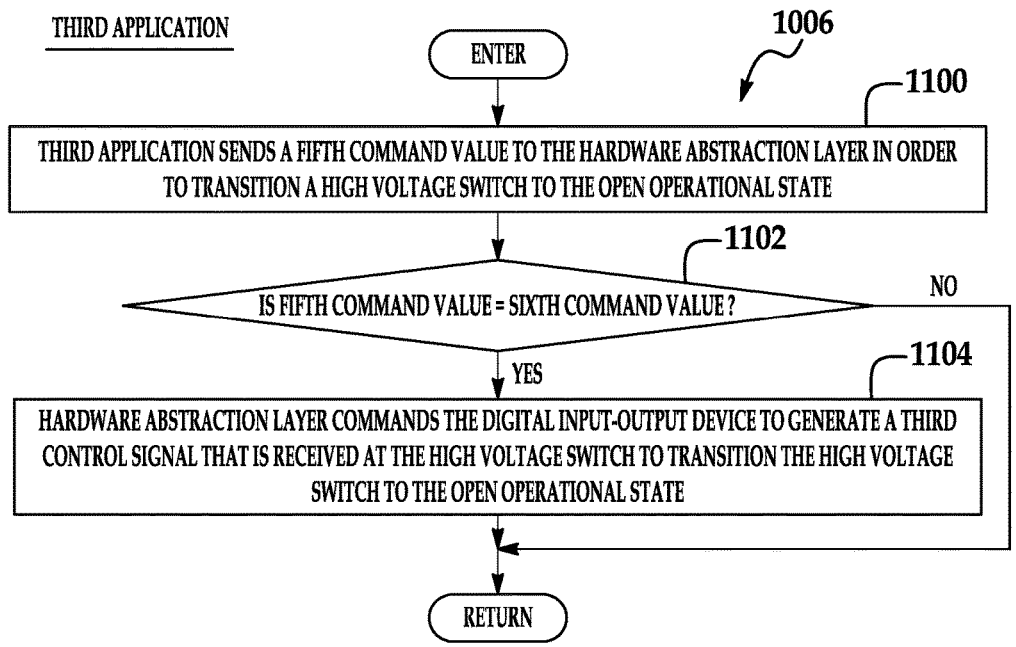

Referring to FIGS. 1 and 7, the third application 1006 will now be explained.

At step 1100, the third application 1006 sends a fifth command value (e.g., 81 shown in FIG. 15) to the hardware abstraction layer 1018 in order to transition a high voltage switch 200 to the open operational state. After step 1100, the method advances to step 1102.

At step 1102, the hardware abstraction layer 1018 makes a determination as to whether the fifth command value is equal to a sixth command value. If the value of step 1102 equals "yes", the method advances to step 1104. Otherwise, the method returns to the main application 1000.

At step 1104, the hardware abstraction layer 1018 commands a digital input-output device 942 to generate a third control signal that is received at the high voltage switch 200 to transition the high voltage switch 200 to the open operational state. After step 1104, the method returns to the main application 1000.

Referring to FIGS. 1 and 8, the fourth application 1008 will now be explained.

At step 1120, the fourth application 1008 sends a seventh command value (e.g., 42 shown in FIG. 16) to the hardware abstraction layer 1018 in order to transition the low voltage switch 270 to the open operational state. The seventh command value has a Hamming distance of at least four from the fifth command value. After step 1120, the method advances to step 1122.

At step 1122, the hardware abstraction layer 1018 makes a determination as to whether the seventh command value is equal to an eighth command value. If the value of step 1122 equals "yes", the method advances to step 1124. Otherwise, the method returns to the main application 1000.

At step 1124, the hardware abstraction layer 1018 commands the digital input-output device 942 to generate a fourth control signal that is received at the low voltage switch 270 to transition the low voltage switch 270 to the open operational state. After step 1124, the method returns to the main application 1000.

Figure 9:
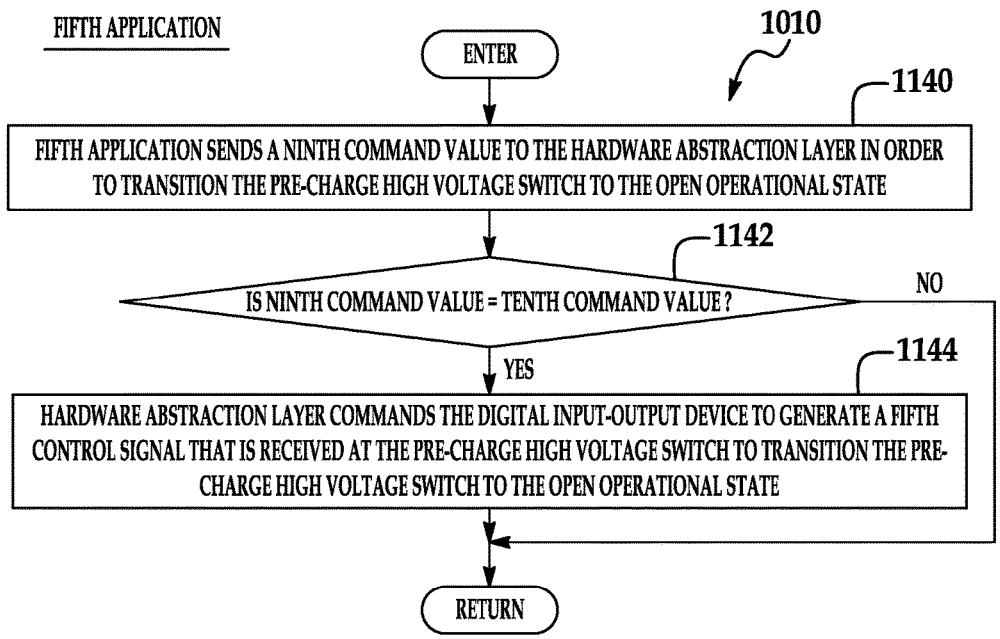

Referring to FIGS. 1 and 9, the fifth application 1010 will now be explained.

At step 1140, the fifth application 1010 sends a ninth command value (e.g., 28 shown in FIG. 17) to the hardware abstraction layer 1018 in order to transition the pre-charge high voltage switch 202 to the open operational state. After step 1140, the method advances to step 1142.

At step 1142, the hardware extraction layer 1018 makes a determination as to whether the ninth command value is equal to a tenth command value. If the value of step 1142 equals "yes", the method advances to step 1144. Otherwise, the method returns to the main application 1000.

At step 1144, the hardware abstraction layer 1018 commands the digital input-output device 942 to generate a fifth control signal that is received at the pre-charge high voltage switch 202 to transition the pre-charge high voltage switch 202 to the open operational state. After step 1144, the method returns to the main application 1000.

Figure 10:
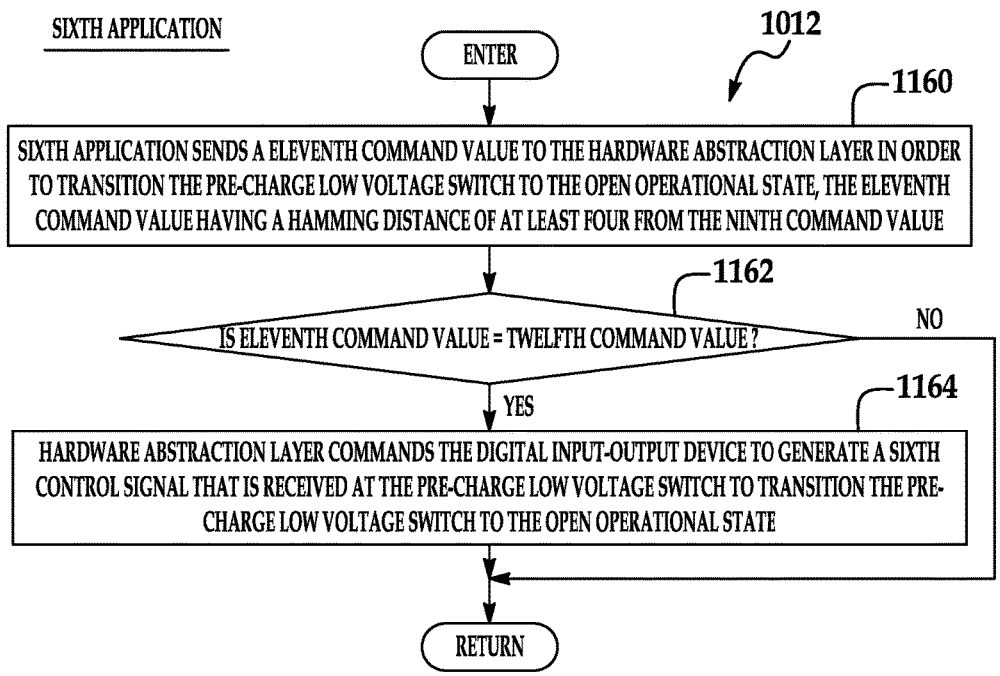

Referring to FIGS. 1 and 10, a sixth application 1012 will now be explained.

At step 1160, the sixth application 1012 sends an eleventh command value (e.g., 14 shown in FIG. 18) to the hardware abstraction layer 1018 in order to transition the pre-charge low voltage switch 272 to the open operational state. The eleventh command value has a Hamming distance of at least four from the ninth command value. After step 1160, the method advances to step 1162.

At step 1162, the hardware abstraction layer 1018 makes a determination as to whether the eleventh command value is equal to a twelfth command value. If the value of step 1162 equals "yes", the method advances to step 1164. Otherwise, the method returns to the main application 1000.

At step 1164, the hardware abstraction layer 1018 commands the digital input-output device 942 to generate a sixth control signal that is received at the pre-charge low voltage switch 272 to transition the pre-charge low voltage switch 272 to the open operational state. After step 1164, the method returns to the main application 1000.

Figure 11:
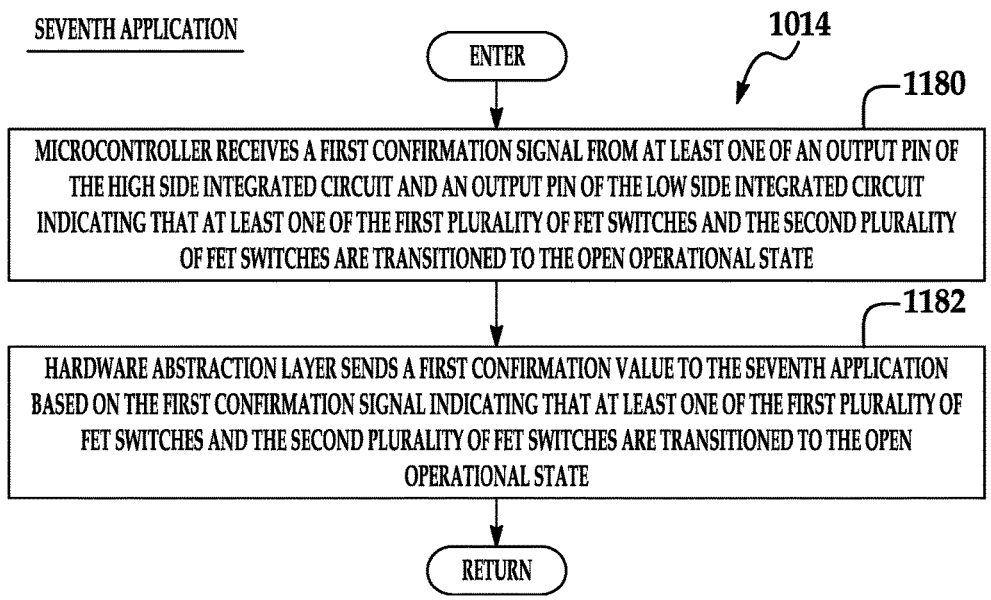

Referring to FIGS. 1 and 11, the seventh application 1014 will now be explained.

At step 1180, the microcontroller 800 receives a first confirmation signal from at least one of an output pin 504 of the high side integrated circuit 450 and an output pin 604 of the low side integrated circuit 452 indicating that at least one of the first plurality of FET switches 506 and the second plurality of FET switches 606 are transitioned to the open operational state. After step 1180, the method advances to step 1182.

At step 1182, the hardware abstraction layer 1018 sends a first confirmation value (e.g., EB shown in FIG. 19) to the seventh application 1014 based on the first confirmation signal indicating that at least one of the first plurality of FET switches 506 and the second plurality of FET switches 606 are transitioned to the open operational state. After step 1182, the method returns to the main application 1000.

Figure 12:
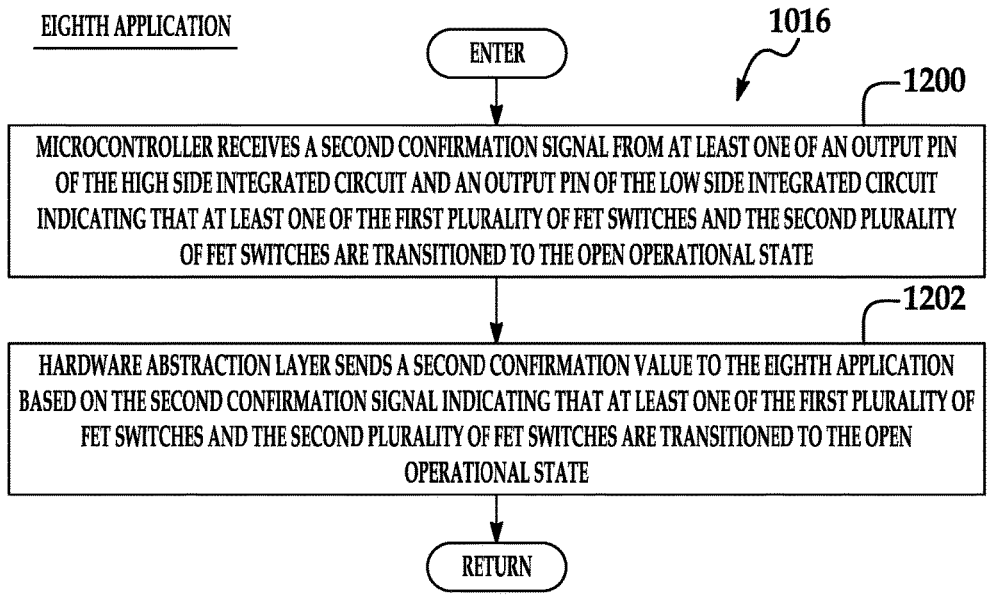

Referring to FIGS. 1 and 12, the eighth application 1016 will now be explained.

At step 1200, the microcontroller 800 receives a second confirmation signal from at least one of an output pin 504 of the high side integrated circuit 450 and an output pin 604 of the low side integrated circuit 452 indicating that at least one of the first plurality of FET switches 506 and the second plurality of FET switches 606 are transitioned to the open operational state. After step 1200, the method advances to step 1202.

At step 1202, the hardware abstraction layer 1018 sends a second confirmation value (e.g., DE shown in FIG. 20) to the eighth application 1016 based on the second confirmation signal indicating that at least one of the first plurality of FET switches 506 and the second plurality of FET switches 606 are transitioned to the open operational state. After step 1202, the method returns to the main application 1000.

The control system for transitioning a DC-DC voltage converter from a buck operational mode to a safe operational mode provides a substantial advantage over other control systems. In particular, the control system utilizes a microcontroller with redundant and independent applications that send distinct command values to a hardware abstraction layer to command the microcontroller to generate control signals to transition desired switches within a DC-DC voltage converter control circuit in the DC-DC voltage converter to open operational states. The distinct command values have a Hamming distance of at least four from one another to ensure that correct command values are being received by the hardware abstraction layer. As a result, the inventive control system can more reliably transition the DC-DC voltage converter to the safe operational mode.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A control system for transitioning a DC-DC voltage converter from a buck operational mode to a safe operational mode, the DC-DC voltage converter having a DC-DC voltage converter control circuit with a high side integrated circuit and a low side integrated circuit; the high side integrated circuit having a first plurality of FET switches therein, the low side integrated circuit having a second plurality of FET switches therein, comprising:

a microcontroller having a digital input-output device, first and second applications, and a hardware abstraction layer;

the first application sending a first command value to the hardware abstraction layer in order to transition the first and second plurality of FET switches to the open operational state;

the hardware abstraction layer commanding the digital input-output device to generate a first control signal that is received at a first input pin of the high side integrated circuit and a first input pin of the low side integrated circuit to transition the first and second plurality of FET switches to the open operational state, when the first command value is equal to a second command value;

the second application sending a third command value to the hardware abstraction layer in order to transition the first and second plurality of FET switches to the open operational state, the third command value having a Hamming distance of at least four from the first command value; and the hardware abstraction layer commanding the digital input-output device to generate a second control signal that is received at a second input pin of the high side integrated circuit and a second input pin of the low side integrated circuit to transition the first and second plurality of FET switches to the open operational state, when the third command value is equal to a fourth command value.

2. The control system of claim 1 wherein:

the microcontroller receiving a first confirmation signal from at least one of an output pin of the high side integrated circuit and an output pin of the low side integrated circuit, the hardware abstraction layer sending a fifth command value to a third application based on the first confirmation signal that indicates that at least one of the first plurality of FET switches and the second plurality of FET switches are transitioned to the open operational state.

3. The control system of claim 2 wherein:

the microcontroller receiving a second confirmation signal from at least one of the output pin of the high side integrated circuit and the output pin of the low side integrated circuit, the hardware abstraction layer sending a sixth command value to a fourth application based on the second confirmation signal that indicates that at least one of the first plurality of FET switches and the second plurality of FET switches are transitioned to the open operational state.

4. The control system of claim 1, wherein the DC-DC voltage converter further includes a high voltage switch, a pre-charge high voltage switch, a low voltage switch, and a pre-charge low voltage switch; and prior to the first application sending the first command value, the DC-DC voltage converter is in the buck operational mode in which the high voltage switch has a closed operational state, the pre-charge high voltage switch has the closed operational state, the low voltage switch has the closed operational state, and the pre-charge low voltage switch has the closed operational state.

5. The control system of claim 1, wherein the high voltage switch is a bi-directional MOSFET switch, and the low voltage switch is a bi-directional MOSFET switch.

6. A control system for transitioning a DC-DC voltage converter from a buck operational mode to a safe operational mode, the DC-DC voltage converter having a high voltage switch and a pre-charge high voltage switch, comprising:

a microcontroller having a digital input-output device, first and second applications, and a hardware abstraction layer;

the first application sending a first command value to the hardware abstraction layer in order to transition the high voltage switch to an open operational state;

the hardware abstraction layer commanding the digital input-output device to generate a first control signal that is received at the high voltage switch to transition the high voltage switch to the open operational state, when the first command value is equal to a second command value;

the second application sending a third command value to the hardware abstraction layer in order to transition the pre-charge high voltage switch to the open operational state, the third command value having a Hamming distance of at least four from the first command value; and the hardware abstraction layer commanding the digital input-output device to generate a second control signal that is received at the pre-charge high voltage switch to transition the pre-charge high voltage switch to the open operational state, when the third command value is equal to a fourth command value.

7. The control system of claim 6, wherein the DC-DC voltage converter further includes a low voltage switch and a pre-charge low voltage switch, and prior to the first application sending the first command value, the DC-DC voltage converter is in the buck operational mode in which the high voltage switch has a closed operational state, the pre-charge high voltage switch has the closed operational state, the low voltage switch has the closed operational state, and the pre-charge low voltage switch has the closed operational state.

8. The control system of claim 6, wherein the high voltage switch is a bi-directional MOSFET switch, and the pre-charge high voltage switch is a bi-directional MOSFET switch.

9. A control system for transitioning a DC-DC voltage converter from a buck operational mode to a safe operational mode, the DC-DC voltage converter having a low voltage switch and a pre-charge low voltage switch, comprising:

a microcontroller having a digital input-output device, first and second applications, and a hardware abstraction layer;

the first application sending a first command value to the hardware abstraction layer in order to transition the low voltage switch to an open operational state;

the hardware abstraction layer commanding a digital input-output device to generate a first control signal that is received at the low voltage switch to transition the low voltage switch to the open operational state, when the first command value is equal to a second command value;

the second application sending a third command value to the hardware abstraction layer in order to transition the pre-charge low voltage switch to the open operational state, the third command value having a Hamming distance of at least four from the first command value; and the hardware abstraction layer commanding the digital input-output device to generate a second control signal that is received at the pre-charge low voltage switch to transition the pre-charge low voltage switch to the open operational state, when the third command value is equal to a fourth command value.

10. The control system of claim 9, wherein the DC-DC voltage converter further includes a high voltage switch and a pre-charge high voltage switch, and prior to the first application sending the first command value, the DC-DC voltage converter is in the buck operational mode in which the high voltage switch has a closed operational state, the pre-charge high voltage switch has the closed operational state, the low voltage switch has the closed operational state, and the pre-charge low voltage switch has the closed operational state.

11. The control system of claim 9, wherein the low voltage switch is a bi-directional MOSFET switch, and the pre-charge low voltage switch is a bi-directional MOSFET switch.

* * * * *